June 16, 1959 — R. CLADE — 2,890,856

SPHERICAL PLUG VALVE

Filed Jan. 31, 1955 — 2 Sheets-Sheet 1

INVENTOR
ROBERT CLADE
BY
Hart, Shields and Price
ATTORNEYS

INVENTOR
*ROBERT CLADE*
BY
*Hart, Shields and Price*
ATTORNEYS

United States Patent Office 2,890,856
Patented June 16, 1959

2,890,856

SPHERICAL PLUG VALVE

Robert Clade, Detroit, Mich., assignor, by mesne assignments, to ACF Industries, Inc., a corporation of New Jersey Application January 31, 1955, Serial No. 484,872

2 Claims. (Cl. 251—174)

This invention relates to plug valves in general and in particular to plug valves of the spherical or ball type.

Substantially all spherical or ball type valves have been built in the past with either soft metal seats or organic seats conformed to the spherical surface. Such valves are expensive to produce due to the necessity of conforming the seat to the plug and cannot be used under high temperatures or in hazardous locations where heat from a fire could damage or burn away the body seat. It is an object, therefore, of the present invention to provide a valve of the spherical plug type which is adapted for use at high temperatures or in hazardous locations.

A further object of the invention is the provision of a spherical plug type valve having the body seats formed of thin resilient metal.

A still further object of the invention is the provision of a spherical plug valve having the body seats formed of resilient metal with the seats normally of conical form and tending to move into a concave conoidal form under load conditions.

A yet further object of the invention is the provision of a spherical plug valve having resilient body seats normally spaced from the closures or supporting members and in which the closure or supporting members are formed so as to act as valve seats in case of destruction or injury to the resilient seat.

A still further object of the invention is the provision of a valve body seat member formed of thin resilient metal having a planar portion and a right circular frusto conical portion forming a valve seat with the inner edges acting in hoop tension to seal with the valve.

These and other objects of the invention will be apparent to persons skilled in the art from a study of the following description and drawings in which.

Figure 1:
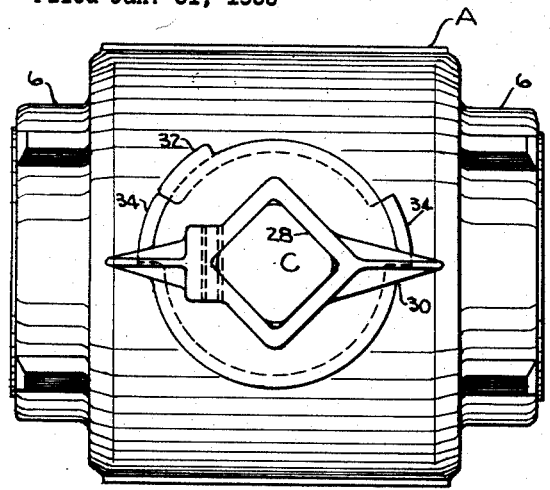
Fig. 1 is an elevational view of the improved valve.

Referring now to the drawings in detail it will be seen that the valve is formed of three principal parts, namely the body A, spherical plug or ball B and operating stem C. The body, as clearly shown, is of generally tubular formation having a central passage 2 enlarged and threaded at its ends as at 4. The threads are adapted to engage similar threads on end closure members 6 which may be internally threaded as at 8 or they may be of the flanged type adapted to be bolted to the connecting pipes or other structure. The body passage 2 inwardly of the threaded portions is provided with a shoulder 10 against which may be clamped the edge of a planar portion 12 of the seat member. The clamping of this planar edge portion is preferably accomplished by jamming the closure members tightly in place, as clearly shown by the figures. The cylindrical body portion is preferably formed with an enlarged protuberance 14 bored and internally threaded to receive a gasket adjusting member 16 which is adapted to bear on and retain a carbon gasket ring 18 which in turn bears on a thrust ring 20 formed on the stem C. The thrust ring bears on a second carbon gasket ring 22. These rings form a low frictional resistance bearing while at the same time preventing leakage out of the valve and past the stem and being formed of carbon will withstand extremely high temperatures without damage.

The stem C inwardly of the thrust ring 20 is provided with a stepped inner end 24 adapted to engage in a slot 26 formed in the surface of the spherical plug or ball B. The upper end 28 of the stem is squared or otherwise formed to receive suitable operating means and the rotation of the stem may be limited by combined indicator and stop plate 30 engaging the stem and provided with a downwardly projecting stop 32 adapted to engage spaced shoulders 34 formed on the protuberance 14 and limiting the stem movement in the present case to approximately 90°. The valve or spherical plug is of true cylindrical formation having a passage 36 extending therethrough and adapted to line up with passages 38 in the end closure members when the valve is in open position.

Figure 4:
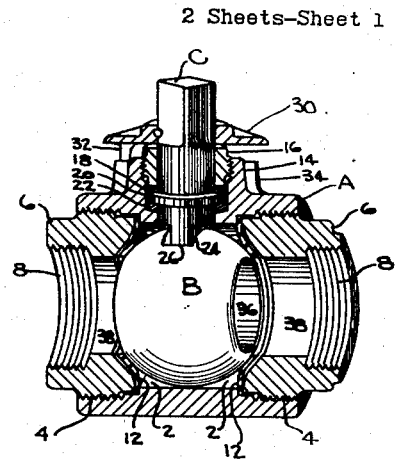
Fig. 4 is a perspective view of the improved valve.
Figure 2:
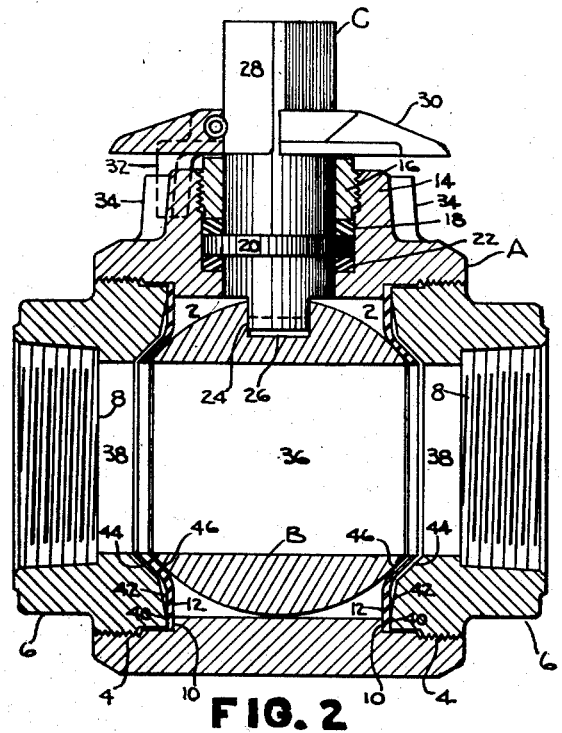
Fig. 2 is a sectional view taken substantially on the longitudinal center line.
Figure 3:
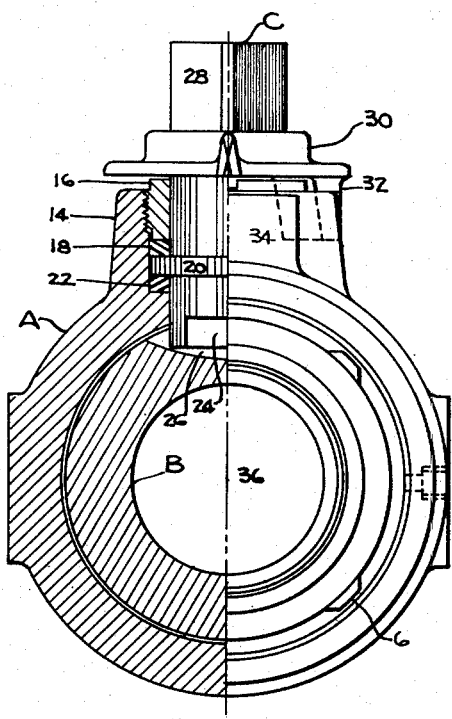
Fig. 3 is a combination end view and section.
Figure 5:
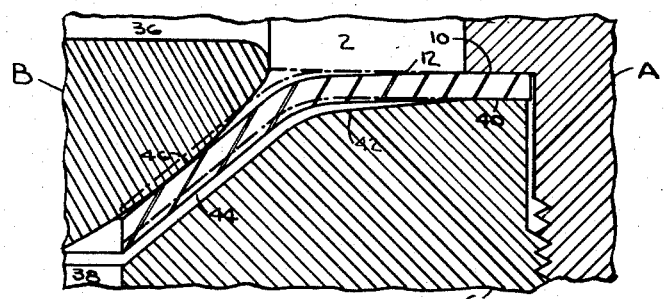
Fig. 5 is an enlarged sectional view showing the relation between the plug, body parts and seat member.
Figure 8:
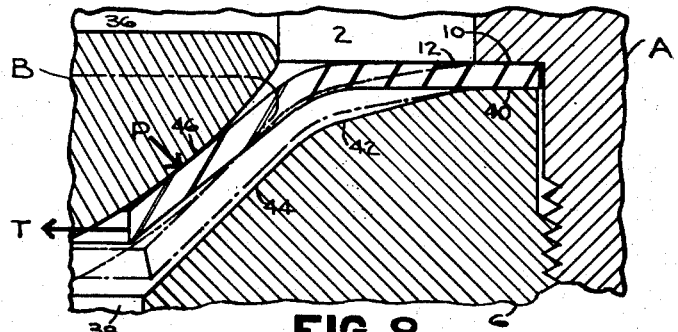
Fig. 8 is an enlarged sectional view with the movement of the parts distorted to better explain the sealing action of the valve.

As best shown in Figs. 2, 4 and 5, each end closure member 6 is formed with a planar portion 40 which engages and clamps the planar portion 12 of the seat member against the shoulder of the body A. Inwardly of the planar portion 40 a slightly conical area 42 is provided which merges into a second conical area 44. This second conical area is substantially parallel to the right circular frusto conical seating portion 46 of the metal seat member. As shown in line-and-dash of Fig. 5 the right circular frusto conical seat portion 46 merges into the planar portion when the parts are assembled and before the pressure has been transmitted from the ball or plug to the conical seat. As best shown in Fig. 8 the seat member is formed with the planar portion 12 and the right circular frusto conical seat portion providing the seat surface 46. When the ball or plug pressure is applied at P it tends to deflect the seat member to the line-and-dash position and in doing so the hoop tension T tends to retain the same circumference of the inner conical portion while the outer or base of the conical portion is retained by the compressive strength in the planar edge 12. These tensile and compressive forces will tend to force the right circular frusto conical surface 46 to assume a concave conoidal shape, in other words, the normally right circular frusto conical seat portion will tend to conform with the spherical plug surface and increase the area of contact between the seat member and plug with increase of pressure. The seat member is made of a resilient metal chosen in accordance with the pressures which must be resisted and having proper strength qualities so as to return to its normal condition after application of pressures imposed thereon by the ball or plug.

Figure 6:
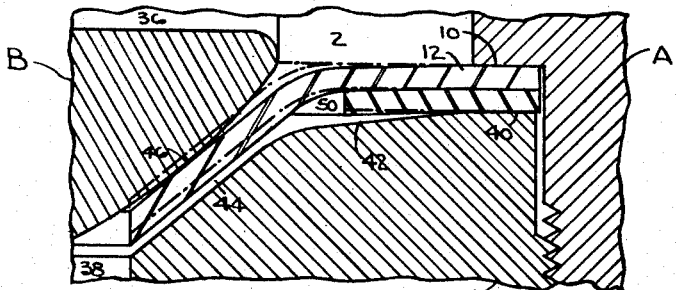
Fig. 6 is an enlarged sectional view similar to Fig. 5, but showing a modification.
Figure 7:
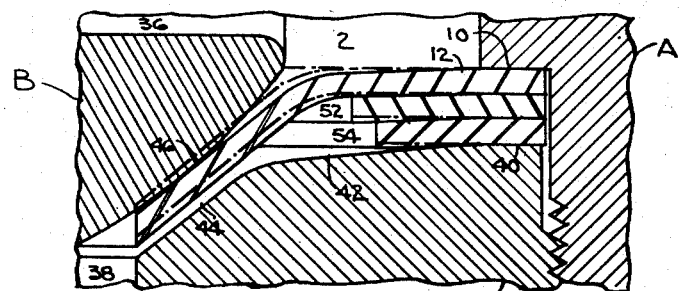
Fig. 7 is an enlarged sectional view similar to Fig. 6, but showing a still further modified form

In cases where the valve may be subjected to extremely high pressures the planar portion 12 may be reinforced by the resilient annular ring 50, as shown in Fig. 6, or in cases of extremely high pressure by two annular rings 52 and 54 of different sizes, Fig. 7. These rings are formed of resilient material and will effectively back-up and strengthen the planar portion without modifying the basic operation of the right circular frusto conical seat portion as a sealing member. These stiffening annular rings will also not affect the safety feature of the valve in that when subjected to destructive temperatures such as in a fire, the seat member may yield allowing the right circular frusto conical portion to bear directly on the emergency seat portion 44 of the closures. Accordingly the ball or plug cannot be blown out of the body and the valve will continue to at least partially control the flow of fluid in the line even under destructive temperatures.

While the invention has been described more or less in detail, it will be obvious that modifications and rearrangements of parts may be made without departing from the scope of the invention as defined by the following claims.

What is claimed is:

1. A spherical plug valve comprising a body having a cylindrical passage therethrough, the central portion of said passage being of a lesser diameter than the end portions thereby forming shoulders, a spherical plug rotatably mounted in the central portion of said passage, said plug provided with a passage which registers with the body passage in valve open position, closure means having a passage coaxial with the body passage extending into each end of the passage, annular seat members, each seat member formed from resilient metallic sheet, having a planar outer portion and a central right circular frusto conical portion, each seat member being interposed between a shoulder and a closure means, said planar portion of said seat members being clamped by the shoulder and closure means, means to retain the closure means in clamping engagement, the central right circular frusto conical portion of the seat members forming the seat surface for said spherical plug and engaging the same in an annular ring of contact intermediate the free edge portion of said right circular frusto conical portion and its juncture with said planar portion, the seat members holding the spherical plug centered in the right circular frusto central portion, the pressure imposed by the spherical plug causing said right circular frusto conical seat surfaces to become convex conoidal surfaces, and the seat members being backed up by a portion of the closure means which limits movement of the seat members.

2. A spherical plug valve comprising a body having a cylindrical passage therethrough, the central portion of said passage being of a lesser diameter than the end portions thereby forming shoulders, a spherical plug rotatably mounted in the central portion of said passage, said plug provided with a passage which registers with the body passage in valve open position, closure means having a passage coaxial with the body passage extending into each end of the passage, annular seat members, each seat member formed from resilient metallic sheet, having a planar outer portion and a central right circular frusto conical portion, each seat member being interposed between a shoulder and a closure means, said planar portion of said seat members being clamped by the shoulder and closure means, means to retain the closure means in clamping engagement, the central right circular frusto conical portion of the seat members forming the seat surface for said spherical plug and engaging the same in an annular ring of contact intermediate the free edge portion of said right circular frusto conical portion and its juncture with said planar portion, the seat members holding the spherical plug centered in the right circular frusto central portion, the pressure imposed by the spherical plug causing said right circular frusto conical seat surfaces to become convex conoidal surfaces, at least one annular planar member inserted between the seat and closure means to reinforce and strengthen the planar portion of the seat member and the right circular frusto conical portion of said seat members being backed up by a portion of the closure means to limit the movement of said portion of said seat members.

References Cited in the file of this patent

UNITED STATES PATENTS

| 2,573,177 | Bohlen | Oct. 30, 1951 |
| 2,593,602 | Pool | Apr. 22, 1952 |
| 2,675,023 | Howe | Apr. 13, 1954 |
| 2,698,731 | Koehler | Jan. 4, 1955 |
| 2,751,185 | Shand | June 19, 1956 |

FOREIGN PATENTS

| 1,922 | Great Britain | Aug. 22, 1859 |
| 253,296 | Great Britain | June 17, 1926 |
| 883,374 | Germany | July 16, 1953 |
| 1,094,708 | France | Dec. 8, 1954 |